United States Patent [19]

Bacon et al.

[11] 4,391,723

[45] Jul. 5, 1983

[54] CONTROLLED RELEASE LAUNDRY BLEACH PRODUCT

[75] Inventors: Dennis R. Bacon, Milford; Frank P. Bossu, West Chester, both of Ohio

[73] Assignee: The Procter & Gamble Company, Cincinnati, Ohio

[21] Appl. No.: 282,562

[22] Filed: Jul. 13, 1981

[51] Int. Cl.$^{3}$ .................... C11D 17/04; C01B 15/00

[52] U.S. Cl. .................................... 252/90; 252/95; 252/99; 252/186.1; 252/186.25; 252/186.38; 252/550; 252/553; 427/242

[58] Field of Search .................... 252/90, 91, 93, 94, 252/95, 99, 100, 186, 550, 553; 427/242

[56] References Cited

U.S. PATENT DOCUMENTS

| | | | |
|---|---|---|---|
| 3,167,513 | 1/1965 | van Embden et al. | 252/102 |
| 3,414,593 | 12/1968 | Robson | 260/400 |
| 3,756,775 | 9/1973 | Nordfalt | 252/99 |
| 3,773,673 | 11/1973 | Jenkins | 252/95 |
| 4,100,095 | 7/1978 | Hutchins et al. | 252/99 |
| 4,126,573 | 11/1978 | Johnston | 252/99 |
| 4,154,695 | 5/1979 | McCrudden | 252/94 |
| 4,170,453 | 10/1979 | Kitko | 252/95 |
| 4,240,920 | 12/1980 | Luque | 252/95 |

FOREIGN PATENT DOCUMENTS

| | | | |
|---|---|---|---|
| 635620 | 1/1962 | Canada | 260/16 |
| 18678 | 11/1980 | European Pat. Off. . | |

OTHER PUBLICATIONS

Parker et al., J. Am. Chem. Soc., 77,4037, (1955)-Preparation of Hydrophobic Bleach.

Parker et al., J. Am. Chem. Soc., 79,1929, (1957)-Preparation of Hydrophilic Bleach.

*Primary Examiner*—John E. Kittle
*Assistant Examiner*—Hoa Van Le
*Attorney, Agent, or Firm*—Richard C. Witte; Leonard Williamson; Ronald L. Hemingway

[57] ABSTRACT

A hydrophilic or hydrotropic peroxyacid laundry bleach plus a surfactant bleach release-delaying agent, contained inside a pouch, bag or substrate, provides a controlled bleach release laundry product.

8 Claims, 2 Drawing Figures

CONTROLLED RELEASE LAUNDRY BLEACH PRODUCT

TECHNICAL FIELD

This invention relates broadly to bleaching compositions. This invention relates particularly to bleaching compositions which derive their bleaching activity from a compound having an active oxygen content. More particularly, this invention relates to hydrophilic and hydrotropic peroxyacid bleaching compositions contained in a pouch, bag or substrate for laundry bleaching. Still, more particularly, this invention relates to a controlled release laundry bleach product.

BACKGROUND ART

When a peroxyacid bleach is dissolved or released into a laundry wash solution bleaching begins. Controlled release of the peroxyacid bleach is important in various laundering systems.

DELAYED BLEACH RELEASE: Delayed release of peroxyacid into a wash solution is advantageous when certain bleach incompatible components are in the laundering system. For example, the use of enzymatic material for specific removal of stains on which peroxyacid bleaches are deficient make the formulation of laundry systems comprising a peroxyacid bleach and enzymes desirable. However, since enzymes and bleach are incompatible, the delayed release or dissolution of the bleach into the solution are the rapid release of the enzyme into the wash solution is desirable. Such a system provides both improved enzyme and bleach performance as compared to a system in which both are released into the wash solution at the same time.

RAPID BLEACH RELEASE: While delayed bleach release is desirable in some laundering systems, it is undesirable in others; specifically, when the rapid release of all of the bleach is desirable for maximum peroxyacid bleaching; for example, in a laundering system which does not contain enzymatic material.

PUBLISHED REFERENCES: The following references will serve as background art for the present invention.

European Patent Application No. 18,678, published Nov. 12, 1980, Tan Tai Ho, discloses a bleach product comprising a percompound contained within a bag of fibrous material. The bag is coated with a protective water-permeable coating which is removable in 30°-75° C. water.

Example V of the Ho EPO Patent Application discloses a coated bagged powder "diperisophthalic acid including a stabilizer (sic)." Ho reports in Example V that "the detrimental effect of diperisophthalic acid upon enzymes is delayed, and therefore improvement in enzymatic efficiency is obtained."

Other useful background art is listed below.

| | Inventor | Issue Date |
|---|---|---|
| Canadian Pat. No. | | |
| 635,620 | McCune | 1/30/62 |
| U.S. Pat. No. | | |
| 3,414,593 | Robson | 12/3/68 |
| 4,017,411 | Diehl et al. | 4/12/77 |
| 4,100,095 | Hutchins | 7/11/78 |
| 4,126,573 | Johnston | 11/21/78 |

OBJECTS: An object of the present invention is to provide a controlled release laundry bleach product which does not require a coated bag.

Other objects of the present invention will be apparent in the light of the following disclosure.

SUMMARY OF THE INVENTION

A dry, granular controlled release laundry bleach product in a pouch comprising:

I. a peroxyacid bleach selected from the group consisting of hydrotropic and hydrophilic peroxyacid bleaches, e.g., diperoxydodecanedioic acid (DPDA);

II. an effective amount of a bleach release-delaying agent; e.g., sodium laurate at a level of at least 10% by weight of the DPDA;

said bleach and agent being contained within a closed water-insoluble but water-permeable pouch of fibrous material, preferably nonwoven polyester fabric having a density of 5 to 100 gm/m$^2$ said agent consisting of a surfactant selected from the group consisting of peroxyacid compatible synthetic detergents and short chain fatty acid soaps having carbon chain lengths of from about 8 to 14, whereby said agent delays the release of said peroxyacid bleach from said pouch into laundry wash liquor.

DETAILED DESCRIPTION OF THE INVENTION

Figure 1:
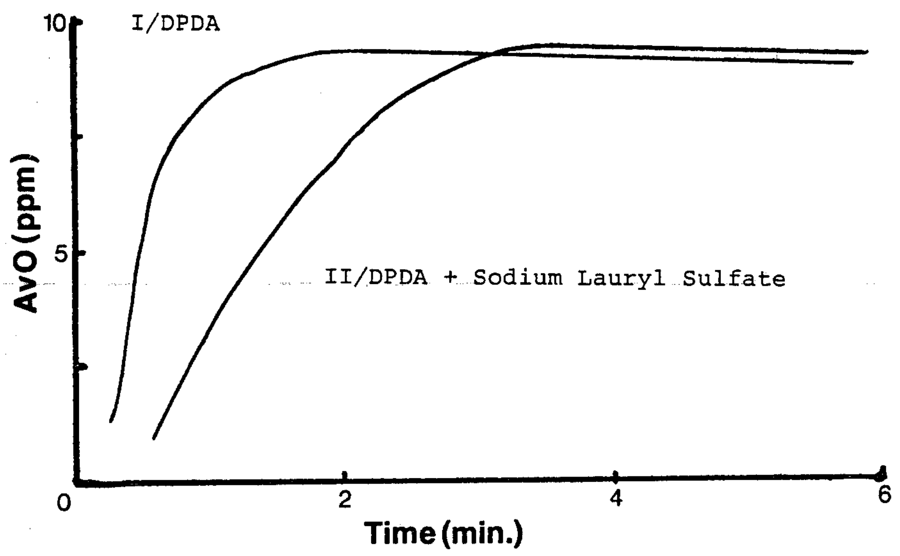
FIGS. 1 and 2 are graphs illustrating the operation of the controlled bleach release product of the present invention.

The pouched peroxyacid bleach granules component of the instant invention is normally solid, i.e., dry or solid at room temperature. The pouched peroxyacid component or components of the present invention, in general, are the organic peroxyacids, water-soluble salts thereof which yield a species containing a —O—O—$^-$ moiety in aqueous solution, and adducts of the organic peroxyacids and urea. These materials have the general formulae:

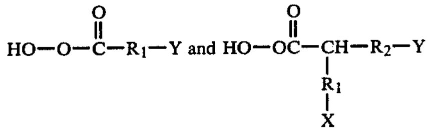

wherein $R_1$ and $R_2$ are alkylene groups containing from 1 to about 20 carbon atoms or phenylene groups, and X and Y are hydrogen, halogen, alkyl, aryl or any group which provides an anionic moiety in aqueous solution. Such X and Y groups can include, for example,

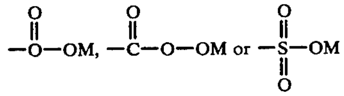

wherein M is H or a water-soluble, salt-forming cation. It is preferred that the acids used in the present invention be dried to a moisture level lower than 1.0%, and preferably lower than 0.5%.

Herein, peroxyacids are classified as (1) hydrophilic, (2) hydrophobic, or (3) hydrotropic. In one respect, these classifications are based on their different levels of effectiveness on real world soils. Real world soils contain hydrophilic and/or hydrophobic components. A hydrophilic bleach is most effective on a hydrophilic bleachable soil, such as tea (tannic acid based), fruit juices, and the like. On the other hand, hydrophobic bleaches are most effective on hydrophobic bleachable soils, such as body soils (fatty acid/triglyceride based). Hydrotropic bleaches find utility on both types of soils, but are less effective on hydrophilic soils than hydrophilic bleaches and less effective on hydrophobic soils than hydrophobic bleaches. Combinations of peroxyacids of the different classes can be used.

In another respect, "hydrophilic bleach" is defined as a peroxyacid whose parent carboxylic acid (or the salts thereof): (1) has no measurable critical micelle concentration (CMC) below 0.5 moles per liter (M/l) and (2) has a chromatographic retention time of less than 5.0 minutes the following high pressure liquid chromatographic (HPLC) conditions:

Elution with 50:50 methanol/water solvent at the rate of 1.5 ml/min. through a DuPont Zorbax ODS® column using a Waters R-401 Refractive Index Detector®.

The "hydrophobic bleach" is defined as a peroxyacid whose parent carboxylic acid (or salts thereof) has a CMC of less than 0.5 M.

The "hydrotropic bleach" is defined as a peroxyacid whose parent carboxylic acid (or salts thereof) has no measurable CMC below 0.5 M and has a chromatographic retention time of greater than 5.0 minutes under the HPLC conditions described above. In accordance with the present invention, the CMC is measured in aqueous solution at 20°-50° C.

The two classes of peroxyacid bleaches pertinent to this invention are: hydrophilic and hydrotropic bleaches.

Hydrophilic peroxyacid bleaches can include:

1. Alkyl alpha, omega—diperoxyacids $HO_3C-(CH_2)_n-CO_3H$ n=2-7, preferably 2-5; e.g., diperoxyadipic acid wherein n=4.

2. Alkyl monoperoxydioic acids $HO_2C-(CH_2)_n-CO_3H$ n=2-7, preferably 2-5; e.g., monoperoxyadipic acid wherein n=4.

3. Alkyl monoperoxyacids $CH_3-(CH_2)_n-CO_3H$ n=0-5, preferably 0-3; e.g., proxybutyric acid wherein n=2.

4. Alpha-substituted monoperoxyacids $CH_3(CH_2)_n-CH-CO_3H$
|
X n=0-5, preferably 0-3; X=$CH_2CO_2H$, $-CH_2CO_3H$, $-SO_3Na^+$, or $-N^+R_1R_2R_3$ and wherein any R=H or $C_1$-$C_4$; e.g., peroxypentanoic acid, 2-propyl monoperoxysuccinic acid, diperoxysuccinic acid, alpha-sulfoperoxypentanoic acid and alpha-tetramethylammonium peroxypentanoic acid, respectively, wherein n=2.

5. Aromatic monoperoxyacids

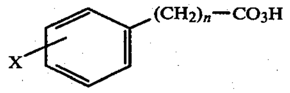

X: substitution in 2-6 positions n=0-6, preferably 0-3;

X=Hydrogen, Halogen, $-(CH_2)_mCO_2H$ or Aromatic;

m=0-7 and n+m=0-7; e.g., peroxybenzoic acid wherein n=0 and

X=Hydrogen.

6. Aromatic diperoxyacids

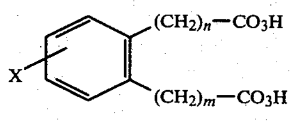

X and $-(CH_2)_mCO_3H$: substitution in 2-6 positions

X=Hydrogen, Halogen or Aromatic n+m=0-7, preferably 0-4; e.g., diperoxyphthalic acid wherein n=m=0 and X=Hydrogen.

Hydrotropic peroxyacid bleaches can include:

1. Alkyl alpha, omega—diperoxyacids $HO_3C-(CH_2)_n-CO_3H$ n=8-14, preferably 9-12; e.g., diperoxydodecanedioic acid wherein n=10.

2. Alkyl monoperoxydioic acids $HO_2C-(CH_2)_n-CO_3H$ n=8-14, preferably 9-12; e.g., monoperoxydodecanedioic acid.

3. Aromatic diperoxyacids

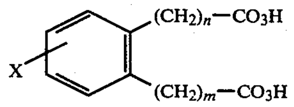

X and $-(CH_2)_mCO_3H$: substitution in 2-6 positions

X=Hydrogen, Halogen or Aromatic n+m=8-14, preferably 9-12; e.g., 1,2-(5-peroxypentanoic acid)benzene wherein m=n=5 and X=Hydrogen.

4. Aromatic monoperoxydioic acids

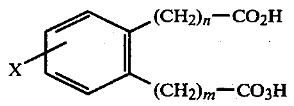

X and $-(CH_2)_mCO_3H$: substitution in 2-6 positions

X=Hydrogen, Halogen or Aromatic n+m=8-14, preferably 10-14; e.g., 1-(5-pentanoic acid)-2-(5-peroxypentanoic acid)benzene wherein m=n=5 and X=Hydrogen.

Preparation of a Hydrotropic Bleach

The hydrotropic peroxyacid, 1,12-diperoxydodecanedioic acid, was prepared by the oxidation of dodecanedioic acid with hydrogen peroxide in the pesence of sulfuric acid. Reaction conditions were typical of those cited in the literature (e.g., McCune Can. 635,620). Neither the mono- or disodium salts of dodecanedioic acid has a measurable CMC below 0.5 M and the parent acid has a retention time of 23.3 minutes under the chromatographic conditions previously cited. The diperoxyacid-water mixture resulting from the synthesis contained 34% peroxyacid. This mixture was blended with finely ground urea (3 parts urea to 1 part peroxyacid) and dried. The resulting chemical was partially adducted and was analyzed to contain 2.7% AvO.

Preparation of Another Hydrotropic Bleach

The hydrotropic peroxyacid, 1,13-diperoxytridecanedioic acid, was prepared by oxidation of tridecanedioic acid with hydrogen peroxide in the presence of sulfuric acid and water. Typical reaction conditions involve diluting 408 g of concentrated sulfuric acid with water to 420 g and with chilling, adding 80 g of 50% hydrogen peroxide. 50 g of tridecanedioic acid powder is added to the chilled solution with continuous agitation. Temperature of the reaction is raised slowly to 25°-30° C. and held for 2 hours. Reaction mix was chilled and quenched with 500 g of cold $H_2O$. Crystals of diperoxytridecanedioic acid were collected and washed with water to remove sulfuric acid. The resulting product was a mixture of peroxyacid and water, which analyzed to contain 4.6% AvO. The mono- and disodium salts of tridecanedioic acid have no apparent CMC below 0.5 M, and the parent acid has a retention time of 97 minutes under the previously cited chromatographic conditions.

Hydrophobic peroxyacid bleaches are distinguished from the bleaches of this invention, however, they can include:

1. Alkyl monoperoxyacids $CH_3(CH_2)_n—CO_3H$ n=6-16, preferably 8-12; e.g., peroxylauric acid wherein n=10.

For example, $C_8$-$C_{16}$ monoperoxyacids belong to the hydrophobic class since the CMC of each parent acid is less than 0.5 M. (Table I-A).

2. Alpha-substituted alkyl monoperoxyacids

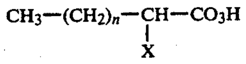

n=6-16, preferably 8-16;
X=—$CH_2CO_2H$, —$CH_2CO_3H$, —$SO_3Na^+$, or —$N^+R_1R_2R_3$ and
R=Hydrogen or $C_1$-$C_{16}$; e.g., 2-lauryl monoperoxysuccinic acid wherein
n=11; 2-lauryl diperoxysuccinic acid wherein
n=11; alpha-sulfo hexadecanoic acid wherein
n=13; and alpha-tetramethylammonium hexadecanoic acid wherein n=13 and the R's=$CH_3$.

3. Aromatic peroxyacids

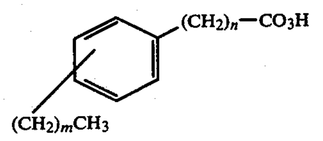

substitution in 3-5 position m=8-16, preferably 10-16;
n=0-16; e.g., 4-lauryl peroxybenzoic acid.

TABLE I-A

Typical Critical Micelle Concentrations For The Sodium Salts of Carboxylic Acids[1]

| | Critical Micelle Concentration[2] (Molar) |
|---|---|
| Sodium octanoate | $3.5 \times 10^{-1}$ |
| Sodium decanoate | $9.6 \times 10^{-2}$ |
| Sodium dodecanoate | $2.3 \times 10^{-2}$ |
| Sodium tetradecanoate | $6.9 \times 10^{-3}$ |
| Sodium hexadecanoate[3] | $2.1 \times 10^{-3}$ |

[1]Source: Critical Micelle Concentrations of Aqueous Surfactant Systems, NSRDS-NBS 36, 1971.
[2]25° C., aqueous solution.
[3]50° C., aqueous solution.

Laundry Bleach Liquor

In typical laundry liquor, e.g., containing 64 liters of 16°-60° C. water, the pouch preferably contains a level of peroxyacid which provides about 1 to about 150 ppm available oxygen (AvO), more preferably 5-50 ppm. The laundry liquor should also have a pH of from 7 to 10, preferably 7.5 to 9, for effective peroxyacid bleaching.

Surfactants

It is important that peroxyacid compatible surfactants are used in the pouched bleach product of this invention. In accordance with the present invention; surfactants are incorporated into the pouched bleached compositions at levels of from about 10% to about 60%, preferably from about 20% to about 50% of the composition. Examples of suitable surfactants are given below.

Water-soluble salts of the fatty acids "soaps", are useful as the surfactant herein. This class of surfactants includes ordinary alkali metal soaps such as the sodium, potassium, ammonium and alkanolammonium salts of fatty acids containing from about 8 to about 14 carbon atoms and preferably from about 12 to about 14 carbon atoms. Soaps can be made by direct saponification of fats and oils or by the neutralization of free fatty acids. Useful are the sodium and potassium salts of the mixtures of fatty acids derived from coconut oil, i.e., sodium or potassium coconut soaps.

Another class of anionic surfactants includes water-soluble salts, particularly the alkali metal, ammonium and alkanolammonium salts, of organic sulfuric reaction products having in their molecular structure an alkyl group containing from about 8 to about 22 carbon atoms and a sulfonic acid or sulfuric acid ester group. (Included in the term "alkyl" is the alkyl portion of acyl groups.) Examples of this group of synthetic surfactants which can be used in the present bleaching compositions are the sodium and potassium alkyl sulfates, especially those obtained by sulfating the higher alcohols ($C_8$-$C_{18}$ carbon atoms) produced by reducing the glycerides of tallow or coconut oil; and sodium and potassium alkyl benzene sulfonates, in which the alkyl group contains from about 9 to about 15 carbon atoms in straight chain or branched chain configuration, e.g., those of the type described in U.S. Pat. No. 2,220,099, Guenther et al., issued Nov. 5, 1940; and U.S. Pat. No. 2,477,383, Lewis, issued July 26, 1949, incorporated herein by reference.

Other anionic surfactant compounds useful herein include the sodium alkyl glyceryl ether sulfonates, especially those ethers of higher alcohols derived from tallow and coconut oil; sodium coconut oil fatty acid monoglyceride sulfonates and sulfates; and sodium or potassium salts of alkyl phenol ethylene oxide ether sulfates containing about 1 to about 10 units of ethylene oxide per molecule and wherein the alkyl groups contain about 8 to about 12 carbon atoms.

Other useful anionic surfactants herein include the water-soluble salts of esters of $\alpha$-sulfonated fatty acids containing from about 6 to about 20 carbon atoms in the ester group; water-soluble salts of 2-acyloxy-alkane-1-sulfonic acids containing from about 2 to about 9 carbon atoms in the acyl group and from about 9 to about 23 carbon atoms in the alkane moiety; alkyl ether sulfates containing from about 10 to about 20 carbon atoms in the alkyl group and from about 1 to about 30 moles of ethylene oxide; water-soluble salts of olefin sulfonates containing from about 12 to about 24 carbon atoms; and $\beta$-alkyloxy alkane sulfonates containing from about 1 to about 3 carbon atoms in the alkyl group and from about 8 to about 20 carbon atoms in the alkane moiety.

Preferred water-soluble anionic organic surfactants herein include linear alkyl benzene sulfonates containing from about 11 to about 14 carbon atoms in the alkyl group; the coconut range alkyl sulfates; the coconut range alkyl glyceryl sulfonates; and alkyl ether sulfates wherein the alkyl moiety contains from about 14 to about 18 carbon atoms and wherein the average degree of ethoxylation varies between 1 and 6.

Specific preferred anionic surfactants for use herein include: sodium linear $C_{10}$–$C_{12}$ alkyl benzene sulfonate; triethanolamine $C_{10}$–$C_{12}$ alkyl benzene sulfonate; sodium coconut alkyl sulfate; sodium coconut alkyl glyceryl ether sulfonate; and the sodium salt of a sulfated condensation product of tallow alcohol with from about 3 to about 10 moles of ethylene oxide.

It is to be recognized that any of the foregoing anionic surfactants can be used separately herein or as mixtures.

Nonionic surfactants include the water-soluble ethoxylates of $C_{10}$–$C_{20}$ aliphatic alcohols and $C_6$–$C_{12}$ alkyl phenols.

Semi-polar surfactants useful herein include water-soluble amine oxides containing one alkyl moiety of from about 10 to about 28 carbon atoms and 2 moieties selected from the group consisting of alkyl groups and hydroxylakyl groups containing from 1 to about 3 carbon atoms; water-soluble phosphine oxides containing one alkyl moiety of about 10 to about 28 carbon atoms and 2 moieties selected from the group consisting of alkyl groups and hydroxyalkyl groups containing from about 1 to about 3 carbon atoms; and water-soluble sulfoxides containing one alkyl moiety of from about 10 to about 28 carbon atoms and a moiety selected from the group consisting of alkyl and hydroxyalkyl moieties of from 1 to 3 carbon atoms.

Ampholytic surfactants include derivatives of aliphatic amines or aliphatic derivatives of heterocyclic secondary and tertiary amines in which the aliphatic moiety can be straight chain or branched and wherein one of the aliphatic substituents contains from about 8 to about 18 carbon atoms and at least one aliphatic substituent contains an anionic water-solubilizing group.

Zwitterionic surfactants include derivatives of aliphatic quaternary ammonium, phosphonium and sulfonium compounds in which the aliphatic moieties can be straight or branched chain, and wherein one of the aliphatic substituents contains from about 8 to about 18 carbon atoms and one contains an anionic water-solubilizing group.

Surfactants are useful processing aids in the production of a peroxyacid bleach granule. For example, in the case of the production of a highly preferred 1,12-diperoxydodecanedioic (DPDA) bleach granule, surfactant provides the necessary surface wetting to allow intimate mixing of the hydrotropic DPDA with boric acid, (an exotherm control agent), and sodium sulfate (a dehydrating agent) in a concentrated aqueous slurry. This mixing is necessary to provide a uniform bleach granule composition upon drying. The surfactant is also necessary to provide phase stability of this same concentrated slurry prior to and during spray drying or prilling operations for particle formation, where the bleach slurry is held for extended periods of time in tanks and at temperatures above the hydrating temperature of sodium sulfate (e.g., about 43° C.).

Surfactants are also necessary to disperse the peroxyacid in the wash liquor in the presence of hardness ions and to suspend soils in solution after they are broken down by the bleach and made susceptible to surfactant removal from fabrics. Thus, a surfactant can be supplied separately when the bleach is used as a laundry additive. However, incorporation of some surfactant into the bleach product is desirable for a bleach used without a detergent, such as in the case of a laundry presoak product.

ADVANTAGES OF DELAYED POUCHED BLEACH RELEASE

It was surprisingly discovered that by adding an effective surfactant to a pouched hydrotropic peroxyacid bleach composition, the otherwise rapid release of the bleach from the pouch into the wash liquor was delayed. Delayed pouch bleach release is highly desirable in some wash systems, particularly when enzymatic material is present in the system. Delayed pouched bleach release thus provides a means to achieve both higly effective enzymatic laundering action and peroxyacid bleaching action in the same wash. The two are incompatible in wash liquor if both are released at the same time.

The delayed release of the peroxyacid into the wash solution would be advantageous, when bleach incompatible components are a desirable part of the laundering system. For example, the use of enzymatic material for specific removal of stains on which peroxyacid bleaches are deficient, make the wash formulation of a peroxyacid bleach with enzymes desirable. However, since enzymes and bleach are incompatible, delayed release of the bleach and the rapid entry of the enzyme into the wash solution would provide improved enzyme performance as well as improve bleach performance as compared to when both are dissolved into the wash at the same time.

Delayed release of bleach also improves perfume effectiveness in the wash solutions.

In all of these cases, the pouched bleach provides a convenient means of physically separating incompatible components of a laundry product during storage and handling. The use of surfactants to delay the release of peroxyacid provides advantageous separation of these same components for a period of time in the wash solution.

A preferred dry, granular laundry bleach product in a pouch comprises:

I. a peroxyacid bleach selected from the group consisting of hydrotropic and hydrophilic peroxyacid bleaches, DPDA; and II. a bleach release-delaying agent;

said bleach and agent being contained within a closed water-insoluble but water-permeable pouch of fibrous material; said agent consisting of a surfactant selected from the group consisting of peroxyacid compatible synthetic detergents and short chain fatty acid soaps having carbon chain lengths of from about 8 to 14, whereby said agent delays the release of said peroxyacid bleach from said pouch into laundry wash liquor.

The above product is more preferred when the bleach release-delaying agent is present at a level of at least about 10% by weight of said peroxyacid bleach but an amount less than 10% can be an effective delaying agent.

The preferred peroxyacid is selected from the group consisting of: diperoxyphthalic, 1,12-diperoxydodecanedioic, 1,11-diperoxyundecanedioic, diperoxyazalaic, diperoxyadipic, and perbenzoic acids.

The preferred bleach release-delaying agent is a surfactant selected from the group consisting of: sodium lauryl sulfate, sodium laurate, ethoxylated tallow alcohol (TAE), and linear alkyl benzene sulfonate (LAS).

The preferred pouch of fibrous material is: polyester fibers having a density of about 5–100 gm/$m^2$ and wherein said pouch material has a pore size such that there is substantially no leakage of the granular bleach product. A more preferred fiber density is about 40–65 gm/$m^2$.

The more preferred granule comprising: 1,12-diperoxydodecanedioic acid and sodium lauryl sulfate at a level of from about 10% to about 60% by weight of said bleach.

A highly preferred granule comprises 1,12-diperoxydodecanedioic acid and sodium laurate present at a level of from about 10% to about 60% by weight of said bleach.

ACID BLEACH RELEASE ACCELERATING ADDITIVE

It was surprisingly discovered that the addition of adipic acid to pouched DPDA/Sodium Lauryl Sulfate granules, accelerated the release of the pouched bleach. In other words, the delayed bleach release of the pouched bleach otherwise provided by the presence of surfactant, was substantially cancelled by the acid additive. Surfactant added to a pouched hydrophilic or hydrotropic peroxyacid bleach provides a means to delay bleach release when desirable. An acid additive, on the other hand, provides a means to cancel that delayed action caused by the surfactant. While delayed pouched bleach release is desirable in some laundering systems; it is undesirable in others. Specifically, when the rapid release of all of the bleach is desirable for maximum peroxyacid bleaching; for example, in laundering systems which do not use enzymatic material. To obtain maximum bleaching the pouched bleach compositions should not, however, contain a level of acid additive which would adjust the pH of the wash liquor to below 7.

Suitable acid additives are water soluble and peroxyacid compatible, and have a pKa of from about 2 to about 7, preferably from 3 to 5. Some preferred acid additives are:

| Acid | pKa |
|---|---|
| benzoic acid | 4.2 |
| adipic acid | 4.4/4,4 |
| succinic acid | 4.2/5.6 |
| citric acid | 3.1/6.0/6.4 |
| tartaric acid | 3.0/4.3 |
| glutaric acid | 4.3/5.4 |

The pKa's of common acids are reported on pages D-120 and 121 of *The CRC Handbook of Chem. & Physics,* 51st Edition, 1970–1971, The Chemical Rubber Co., Cleveland, Ohio, incorporated herein by reference.

As observed above, some acids have multiple pKa's. If one is in the 3 to 5 range, it can be a preferred acid additive.

A preferred dry, granular laundry bleach product in a pouch comprises:

I. a peroxyacid bleach selected from the group consisting of hydrotropic or hydrophilic peroxyacid bleaches, II. a surfactant at a level of at least about 10% by weight of the peroxyacid bleach, said surfactant selected from the group consisting of peroxyacid compatible synthetic detergents and fatty acid soaps, and, III. an effective amount of a water soluble, peroxyacid compatible acid, said acid having a pKa of from about 2 to about 7, said pouch consisting of water-insoluble but waterpermeable fibrous material; whereby said acid accelerates the release of said bleach from the pouch into laundry wash liquor in the presence of said surfactants.

More preferred pouched hydrophilic and hydrotropic peroxyacid bleach compositions contain from 20% to 60% surfactant by weight of the bleach and an effective amount of acid additive; for example, an effective amount of acid to accelerate the release of pouched DPDA/Sodium Lauryl Sulfate granules, is preferably at least about 10% by weight of the peroxyacid component of the granule, but an effective amount of acid can be less than 10% in other compositions. Highly preferred pouched bleach compositions contain surfactant at a level of 35% to 60% by weight of the peroxyacid and contain acid additive at a level of 15% to 30% by weight of the peroxyacid bleach.

The above product is highly preferred when the acid has a pKa of about 3 to about 5.

The preferred acid is selected from the group consisting of: benzoic acid, adipic acid, succinic acid, citric acid, tartaric acid, and glutaric acid.

The preferred effective amount of acid is at least about 10% by weight of the peroxyacid and where or when the product is used the laundry wash liquor maintains a pH of above 7.

The preferred peroxyacid is selected from the group consisting of: diperoxyphthalic, 1,12-diperoxydodecanedioic, 1,11-diperoxyundecanedioic acid, diperoxyazelaic, diperoxyadipic and perbenzoic acids.

The preferred surfactant is selected from the group consisting of: sodium lauryl sulfate, sodium laurate, ethoxylated tallow alcohol (TAE), and linear alkyl benzene sulfonate (LAS).

The preferred pouch of fibrous material is: polyester fibers having a density of about 5 to 100 gm/$m^2$ and wherein said pouch material has a pore size such that there is substantially no leakage of the granular bleach product. The more preferred fiber density is about 40–65 gm/$m^2$.

A highly preferred granule is made of: 1,12-diperoxydodecanedioic acid and sodium lauryl sulfate at a level of from about 10% to about 60% by weight of the bleach, and wherein the acid additive is present at a level of about 10% to about 60% by weight of said bleach.

Another highly preferred granule is made of: 1,12-diperoxydodecanedioic acid and sodium laurate present at a level of from about 10% to about 60% by weight of said bleach, and wherein the acid additive is present at a level of about 10% to about 60% by weight of the bleach.

The most preferred granule is made of: DPDA, adipic acid, and sodium lauryl sulfate is present at a level of about 35–60% by weight of said bleach and wherein said acid is present at a level of about 15–30% by weight of said bleach.

THE POUCH

The present invention provides a convenient bleach product contained in a closed water insoluble but water-permeable pouch substrate, or bag of fibrous material. The bags used to form the products of the invention are the type which remain closed during the laundering process. They are formed from water insoluble fibrous-sheet material, which can be of woven, knitted, or non-woven fabric. The fabric should not disintegrate during the washing process and have a high melt or burn point to withstand the temperatures if carried over from the washer to the dryer.

The sheet material used should have a pore size such that there is substantially no leakage of the granular bleach product through the pouch material of the bag. The bleaching composition particles of this invention should be somewhat larger than the pore diameter of the porous openings in the formed bag to afford containment of the bleach admixture composition unless the pouch is coated with a coating such as those EPO Patent Application No. 18,678, Nov. 12, 1980, Tan Tai Ho, incorporated herein by reference in its entirety. Bleach compositions having an average particle diameter below about 1000 microns and preferably falling in the range from 100 to 500 microns and especially 150–300, rapidly dissolve in water and are preferred for use herein. Accordingly, pouches having an average pore diameter smaller, ca 5–50% smaller, than the particle diameter of the bleaching composition is preferred.

The fibers used for the sheet materials may be of natural or synthetic origin and may be used alone or in admixture, for example, polyester, cellulosic fibers, polyethylene, polypropylene, or nylon. It is preferred to include at least a proportion (about 20%) of thermoplastic fibers, for facilitating heat sealing of bags and resistance to chemical attack by te bleach. A suitable sheet material for forming the bags can be, for example, non-woven polyester fabric of high wet strength and a high melt or burn point weighing about 5 to 100 gm/m$^2$, preferably 40–65 gm/m$^2$.

Polyester is the preferred fiber. If more easily wettable cellulose (e.g., Rayon) or hydrophilic synthetic fibers (e.g., Nylon) are all or part of sheet material, faster release of the peroxyacid to wash liquor is expected compared to the more hydrophobic polyester sheet materials (e.g., polyester, polypropylene) at comparable densities. Thus, such hydrophilic sheet material should have a higher density for delayed pouched bleach release.

Pouches, substrates or bags can be formed from a single folded sheet formed into a tubular section or from two sheets of material bonded together at the edges. For example, the pouch can be formed from single-folded sheets sealed on three sides or from two sheets sealed on four sides. Other pouch shapes or constructions may be used. For example, compressing the bleach admixture composition between two sheets to resemble a single sheet product. Also, a tubular section of material may be filled with bleach admixture and sealed at both ends to form the closed sachet. The particular configuration (shape, size) of the pouch is not critical to the practice of this invention. For example, the pouch can be round, rectangular, square, spherical, or asymetrical. The size of the pouch is generally small. However, they can be made large for multiple uses.

OPTIONAL INGREDIENTS

Many optional ingredients are used with the product of the present invention.

A caveat is when an optional material which is inherently incompatible with the pouched peroxyacid bleach granule of this invention is included, such incompatible material should be separated from the peroxyacid component. Means for separation include: coating either the peroxyacid or the optional component, providing separate compartments in the pouch, or by coating the pouch itself with the incompatible optional material. Means for separating peroxyacid incompatible optional materials are known. See U.S. Pat. No. 4,126,573, Nov. 21, 1978, Johnston.

Detergency Builders

The instant granular compositions can also comprise those detergency builders commonly taught for use in laundry compositions. Useful builders herein include any of the conventional inorganic and organic water-soluble builder salts, as well as various water-insoluble and so-called "seeded" builders.

Inorganic detergency builders useful herein include, for example, water-soluble salts of phosphates, pyrophosphates, orthophosphates, polyphosphates, carbonates, bicarbonates, borates and silicates. Specific examples of inorganic phosphate builders include sodium and potassium tripolyphosphates, phosphates, and hexametaphosphates. Sodium tripolyphosphate is an especially preferred, water-soluble inorganic builder herein.

Nonphosphorous-containing sequestrants can also be selected for use herein as detergency builders. Specific examples of nonphosphorous, inorganic builder ingredients include water-soluble inorganic carbonate, bicarbonate, borate and silicate salts. The alkali metal, e.g., sodium and potassium, carbonates, bicarbonates, borates (Borax) and silicates are particularly useful herein.

Water-soluble, organic builders are also useful herein. For example, the alkali metal, ammonium and substituted ammonium polyacetates, carboxylates, polycarboxylates, succinates, and polyhydroxysulfonates are useful builders in the present compositions and processes. Specific examples of the polyacetate and polycarboxylate builder salts include sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Highly preferred nonphosphorous builder materials (both organic and inorganic) herein include sodium carbonate, sodium bicarbonate, sodium silicate, sodium citrate, sodium oxydisuccinate, sodium mellitate, sodium nitrilotriacetate, and sodium ethylenediaminetetraacetate, and mixtures thereof.

Another type of detergency builder material useful in the present compositions comprises a water-soluble material capable of forming a water-insoluble reaction product with water hardness cations in combination with a crystallization seed which is capable of providing growth sites for said reaction product.

Specific examples of materials capable of forming the water-insoluble reaction product include the watersoluble salts of carbonates, bicarbonates, sesquicarbonates, silicates, aluminates and oxalates. The alkali metal, especially sodium, salts of the foregoing materials are preferred for convenience and economy.

Another type of builder useful herein includes various substantially water-insoluble materials which are capable of reducing the hardness content of laundering liquors, e.g., by ion-exchange processes. Examples of such builder materials include the phosphorylated cloths disclosed in U.S. Pat. No. 3,424,545, Bauman, issued Jan. 28, 1969, incorporated herein by reference.

The complex aliminosilicates, i.e., zeolite-type materials, are useful detergency builders herein in that these materials soften water, i.e., remove hardness ions. Both the naturally occurring and synthetic "zeolites," especially zeolite A and hydrated zeolite A materials, are useful for this purpose. A description of zeolite materials and a method of preparation appear in U.S. Pat. No. 2,882,243, Milton, issued Apr. 14, 1959, incorporated herein by reference.

Also useful are aminophosphonate stabilizers, which are commercially available compounds sold under the names Dequest 2000, Dequest 2041 and Dequest 2060, by The Monsanto Company, St. Louis, Mo.

These compounds have the following structures:

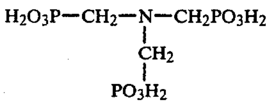

Dequest 2000

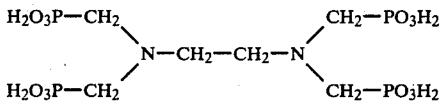

Dequest 2041

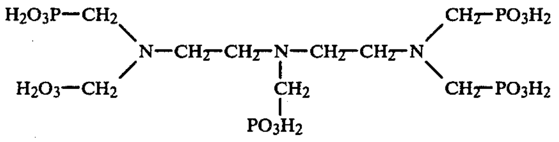

Dequest 2060.

In preferred compositions of the present invention the aminophosphonate compounds can be used in their acid form, represented by the above formulas, or one or more of the acidic hydrogens can be replaced by an alkali metal ion, e.g., sodium or potassium.

Additional stabilizers can also be used, primarily to protect the peroxyacids against decomposition which is catalyzed by heavy metals such as iron and copper. Such additional stabilizing agents are preferably present at levels of from about 0.005% to about 1.0% of the composition. These additional stabilizers can be any of the wellknown chelating agents, but certain ones are preferred. U.S. Pat. No. 3,442,937, Sennewald et al., issued May 6, 1969, discloses a chelating system comprising quinoline or a salt thereof, an alkali metal polyphosphate, and optionally, a synergistic amount of urea. U.S. Pat. No. 2,838,459, Sprout, Jr., issued July 10, 1959, discloses a variety of polyphosphates as stabilizing agents for peroxide baths. These materials are useful herein. U.S. Pat. No. 3,192,255, Cann, issued June 29, 1965, discloses the use of quinaldic acid to stabilize percarboxylic acids. This material, as well as picolinic acid and dipicolinic acid, would also be useful in the compositions of the present invention. A preferred auxilliary chelating system for the present invention is a mixture of 8-hydroxyquinoline or dipicolinic acid and an acid polyphosphate, preferably acid sodium pyrophosphate. The latter may be a mixture of phosphoric acid and sodium pyrophosphate wherein the ratio of the former to the latter is from about 0.2:1 to about 2:1 and the ratio of the mixture of 8-hydroxyquinoline or dipicolinic acid is from about 1:1 to about 5:1. The foregoing patents relating to stabilizers are incorporated herein by reference.

Coatings

The dry granular compositions can be coated with coating materials in order to protect them against moisture and other environmental factors which may tend to cause deterioration of the compositions when stored for long periods of time. Such coating materials may be in general, acids, esters, ethers, surfactants and hydrocarbons and include such a wide variety of materials as fatty acids, derivatives of fatty alcohols such as esters and ethers, poly functional carboxylic acids and amides, alkyl benzene sulfonates, alkyl sulfates and hydrocarbon oils and waxes. These materials aid in preventing moisture from reaching the peroxyacid compound. Secondly, the coating may be used to segregate the peroxyacid compound from other agents which may be present in the composition and which could adversely affect the peroxyacid's stability. The amount of the coating material used is generally from about 2.5% to about 20% based on the weight of the peroxyacid compound. (See U.S. Pat. No. 4,126,573, Johnston, issued Nov. 21, 1978)

Exotherm Control Agents

When subjected to excessive heat, organic peroxyacids can undergo a self-accelerating decomposition which can generate sufficient heat to ignite the peroxyacid. For this reason, it is desirable to include an exotherm control agent in peroxyacid bleaching compositions. Suitable materials include urea, hydrates of potassium aluminum sulfate and aluminum sulfate. A preferred exotherm agent is boric acid (See U.S. Pat. No. 4,100,095, Hutchins, issued July 11, 1978). The exotherm agent is preferably used in the composition at a level of from about 50% to about 400% of the amount of peroxyacid.

Miscellaneous

Various other optional ingredients such as dyes, optical brighteners, perfumes, soil suspending agents and the like may also be used in the compositions herein at the levels conventionally present in detergent and bleaching compositions.

THE EXAMPLES

The following examples illustrate the present invention but are not intended to be limiting thereof.

EXAMPLE 1

1. Preparation of the hydrotropic bleach granules The hydrotropic peroxyacid, 1,12-diperoxydodecanedioic acid (DPDA), was prepared by the oxidation of 1,12-dodecanedioic acid with hydrogen peroxide in the presence of sulfuric acid. Reaction conditions were typical of those cited in the literature (e.g., McCune Can. Pat. No. 635,620). Neither the mono- or disodium salts of dodecanedioic acid has a measurable CMC below 0.5 M and the parent carboxylic acid has a retention time of 23.3 minutes under the chromatographic conditions previously described herein. The diperoxyacid-water mixture resulting from the synthesis contained 41% peroxyacid. The bleach granule was prepared by mixing 3 parts of the peroxyacid-water mixture with 1 part boric acid and 1.2 parts anhydrous sodium sulfate. A mixture of 2 parts acetone and 1 part ethanol was added to the slurry to provide intimate mixing of all of the components. The mix was spread out and dried overnight at ambient conditions. This bleach granule was screened through a 60 U.S.S. mesh screen and its available oxygen (AvO) was measured to be 4.1%.

2. Preparation of the bleach product. Bleach Compositions I-V were then made by dry-mixing the bleach granules with the additives as described in Table I. These were placed in a polyester pouch made by taking about a 76 mm×230 mm piece of polyester nonwoven substrate having a density of about 60 $g/m^2$, folding it in half and heat sealing two sides, placing bleach and additives inside and then sealing the third side to form a pouch of about 76 mm×115 mm. The nonwoven substrate used was Sontara® sold by DuPont.

3. Preparation of the bleach solution and bleach release measurements. The bleach solution was prepared using standard top-loading washing machines filled with 64.4 liters of 37.8° C. water of about 7 grain per gallon hardness. A 2.2 kg bundle of clothes was added to the tub to simulate realistic agitation effects in a normal wash. A phosphate-containing detergent (Tide®) was used at recommended levels and a single pouch was added to each wash. The products are designed to provide a maximum of about 10 ppm AvO in the wash solution when all of the bleach is released from the pouch. Wash aliquots were obtained at the specified times into the wash cycle to within 0.2 minutes. The concentration of peroxyacid in the wash is reported in Table 1A for different times throughout the wash in ppm AvO.

Composition I shows the base case for the release of peroxyacid from the polyester pouch when the bleach granule is DPDA, an exotherm control agent (boric acid) and a process aid (sodium sulfate). No additives were included. The addition of adipic acid to the base composition at about 50% of the peroxyacid level, as in Composition IV, did not accelerate or delay bleach release from the pouch. However, the addition of sodium lauryl sulfate at about 50% of the pouched peroxyacid bleach, as in Composition II, did delay the release of the bleach from the pouch for about three minutes into the wash cycle with over 85% less bleach released within a half minute and over 40% less bleach released within one and a half minutes of the wash cycle. In other words, when the controlled bleach delaying agent is not present, over 700% more bleach is released into the wash within a half minute and over 60% more bleach is released within a minute and a half. See FIG. 1. Delayed release of bleach is highly desirable in washes where enzymes are used. These bleaches and enzymes are incompatible.

Figure 2:
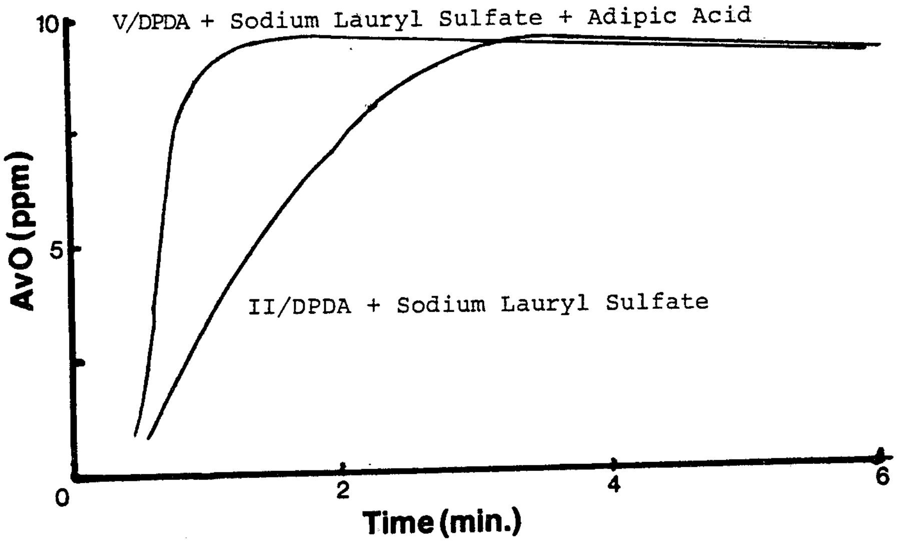

The addition of adipic acid to Composition II, as described by Composition V, showed that adipic acid accelerated release in the presence of the sodium lauryl sulfate providing 100% more bleach than Composition II within a half minute of the wash and nearly 80% more bleach at one and a half minutes. See FIG. 2.

The addition of sodium laurate to Composition I at about 50% of the peroxyacid level resulted in Composition III. This composition delayed near total release until after 3 minutes of the wash cycle. About 50% less bleach is released in the first half minute of the wash with Composition III compared to Composition I.

TABLE 1

| | COMPOSITION PER POUCH (GRAMS)** | | | | |
|---|---|---|---|---|---|
| Ingredients | I | II | III | IV | V |
| Bleach granules* | 15.8 | 15.8 | 15.8 | 15.8 | 15.8 |
| Sodium lauryl sulfate | — | 3.0 | — | — | 3.0 |
| Sodium laurate | — | — | 3.0 | — | — |
| Adipic acid | — | — | — | 3.0 | 3.0 |

*An intimate mix of 1,12-diperoxydodecanedioic acid/boric acid/sodium sulfate in a ratio of 1.0/0.8/1.0 prepared as a slurry with distilled water, ethanol and acetone with overnight drying at ambient conditions. The final compositions were prepared by dry mixing the ingredients.

**Each pouched bleach contained enough DPDA to potentially provide 10 ppm AvO in a 64.4 liter wash solution.

TABLE 1A

| | AvO IN WASH SOLUTIONS (PPM)* | | | | |
|---|---|---|---|---|---|
| Time (minutes) | I | II | III | IV | V |
| 0.5 | 5.9 | 0.8 | 2.9 | 4.9 | 1.7 |
| 1.5 | 8.9 | 5.3 | 6.3 | 9.1 | 9.5 |
| 3.3 | 9.2 | 9.5 | 9.1 | 8.7 | 9.3 |
| 5.0 | 9.1 | 9.4 | 9.3 | 8.5 | 8.8 |
| 10.0 | 8.4 | 8.9 | 8.2 | 8.2 | 8.1 |

*Average of three runs.

EXAMPLE II

1. Preparation of the bleach product. The hydrotropic peroxyacid, 1,12-diperoxydodecanedioic acid, was prepared in the same manner as described in Example I, paragraph 1. Unlike the compositions in Example I, additives such as surfactant and acid were intimately mixed into the slurry with this peroxyacidwater mixture, and the boric acid, and the anhydrous sodium sulfate to produce Compositions VI–XI. A mixture of 2 parts acetone and 1 part ethanol was added to the slurry to provide intimate mixing of the components. They were dried overnight at ambient conditions, ground up and passed through a 60 U.S.S. mesh screen. The AvO was measured for each composition and recorded in Tables 2 and 3.

The bleach compositions VI–IX were then placed in polyester pouches, the same as described in Example I, paragraph 2. With Compositions X and XI, the substrates were coated with an ethoxylated tallow alcohol surfactant ($TAE_{22}$) before pouch formation and sealing. The coating surfactant was first dissolved in steam warmed ethanol to make about a 13% solution and a sprayer was used to coat the substrates. Removal of the solvent by mechanical fanning resulted in a pouch coated with about 1 gram ethoxylated tallow alcohol.

2. Preparation of bleach solutions and the peroxyacid release measurements. The bleach solutions were prepared the same as in Example I, paragraph 3, using the pouch bleach products designated as VI–XI. The products are designed to provide a maximum of about 10 ppm AvO in the wash solution when all of the bleach contents are released from the pouch. The concentration of bleach in the wash at the different times is reported in Table 2A and 3A as ppm AvO.

In Table 2A, Composition VI shows the base case for the release of peroxyacid from the polyester pouch when the bleach granule is DPDA, an exotherm control agent, and a process aid. No additives were included. Composition VII shows that bleach release was delayed when the bleach granule was processed to include the additive, sodium lauryl sulfate, at about 45% by weight of the peroxyacid. At about one and a half minutes into the wash cycle 45% less bleach was released to the wash with Composition VI. The addition of adipic acid at about 58% of the peroxyacid level to Composition VII, as described by Composition VIII, showed that adipic acid accelerated the release of bleach in the presence of sodium lauryl sulfate. With Composition VIII total release occurred within about one and a half minutes of the wash cycle, providing over 120% more bleach at this time than with Composition VII.

TABLE 2

| COMPOSITION PER POUCH (GRAMS)* | | | |
|---|---|---|---|
| Ingredients | VI | VII | VIII |
| 1,12-diperoxy-dodecanedioic acid | 5.5 | 5.5 | 5.5 |
| Boric acid | 4.5 | 4.5 | 4.5 |
| Sodium sulfate | 5.4 | 5.4 | 5.4 |
| Sodium lauryl sulfate | — | 2.4 | 2.5 |
| Adipic acid | — | — | 3.1 |
| AvO of bleach granule (%) | (4.2) | (3.3) | (2.8) |

*Compositions were prepared by slurrying all of the bleach granule ingredients in about 13–25 grams of water, about 3 grams of acetone, and about 7 grams of ethanol with air drying overnight under ambient conditions. Each pouched bleach contained enough DPDA to potentially provide 10 ppm AvO in a 64.4 liter wash solution.

TABLE 2A

| AvO IN WASH SOLUTION (PPM) | | | |
|---|---|---|---|
| Time (minutes) | VI | VII | VIII |
| 1.6 | 9.4 | 5.1 | 11.7 |
| 4.0 | 8.7 | 9.4 | 10.4 |
| 6.5 | 8.9 | 9.4 | 9.4 |
| 10.0 | 7.9 | 9.7 | 8.2 |

Composition IX replaced the additive sodium lauryl sulfate with sodium laurate for the pouch bleach. In this case, the addition of sodium laurate also delayed bleach release, providing about 60% less bleach within about one and a half minute of the wash and about 15% less bleach in the wash than with Composition VI at four minutes.

The use of a nonionic surfactant, ethoxylated tallow alcohol, as an additive to Composition VI results in Composition X. This additive delays release and results in about 22% less bleach within about the first minute and a half of the wash compared to Composition VI with no additive.

The use of the ethoxylated alcohol as only a coating on the pouch at about 20% of the peroxyacid did not delay the release of bleach from the pouch.

TABLE 3

| COMPOSITION PER POUCH (GRAMS)* | | | |
|---|---|---|---|
| Ingredients | IX | X | XI |
| 1,12-diperoxy-dodecanedioic acid | 5.5 | 5.5 | 5.5 |
| Boric acid | 4.5 | 4.5 | 4.5 |
| Sodium sulfate | 5.4 | 5.4 | 5.4 |
| Sodium laurate | 2.4 | — | — |
| Ethoxylated tallow alcohol ($TAE_{22}$) | — | 2.3 | — |
| Pouch coating - Ethoxylated tallow alcohol ($TAE_{22}$) | — | 1.0 | 1.0 |
| AvO of bleach granule (%) | (3.3) | (3.5) | (4.2) |

*Compositions were prepared by slurrying all of the bleach granule ingredients in about 13–25 grams of water, about 3 grams of acetone, and about 7 grams of ethanol with air drying overnight under ambient conditions.

TABLE 3A

| AvO IN WASH SOLUTION (PPM) | | | |
|---|---|---|---|
| Time (minutes) | IX | X | XI |
| 1.6 | 3.8 | 7.4 | 8.9 |
| 4.0 | 7.4 | 8.2 | 9.4 |
| 6.5 | 8.9 | 8.7 | 8.9 |
| 10.0 | 8.7 | 8.2 | 8.4 |

EXAMPLE III

1. Preparation of the bleach product. The hydrotropic peroxyacid, 1,12-diperoxydodecanedioic acid, was prepared in the same manner as described in Example I, paragraph 1. The peroxyacid-water mixture was then slurried at about 43° C. with boric acid, anhydrous sodium sulfate, linear alkylbenzenesulfonate surfactant, $C_3LAS$, and the stabilizing transition metal ion chelants dipicolinic acid, phosphoric acid, and sodium pyrophosphate. The typical composition is prepared with 1 part peroxyacid, 1.1 parts boric acid, 3 parts sodium sulfate, 0.25 parts $C_{13}LAS$, 1.5 parts water, 0.006 parts dipicolinic acid, 0.002 parts phosphoric acid and 0.002 parts sodium pyrophosphate. The dipicolinic acid, phosphoric acid and sodium pyrophosphate were premixed in the $C_{13}LAS$. This slurry is then sprayed into a cooling chamber to form particles and then dried. The AvO of the composition was measured to be 1.44%.

Forty-five grams of the bleach granules were then placed in two pouches described in Example I, paragraph 2. To both pouches was added 2 grams of sodium lauryl sulfate, which is at about 38% of the peroxyacid, and 0.3 grams of perfume encapsulated with PVA. To the second pouch 2.0 grams of adipic acid at about 38% of the peroxyacid was also added. The pouches were heat sealed with a Branson® Model 300 Ultrasonic Sewing Machine made by Branson Sonic Power Company of Danbury, Conn.

Table 4A shows the results of the release of the peroxyacid into the wash for these two pouched bleach compositions. The pouch containing the adipic acid provided about 70% more AvO within about one and a half minutes of the wash cycle.

TABLE 4

| AvO IN WASH SOLUTIONS (PPM)* | | |
|---|---|---|
| Time (minutes) | Bleach Granule + Sodium Lauryl Sulfate | Bleach Granule + Sodium Lauryl Sulfate + Adipic Acid |
| 1.6 | 6.3 | 10.7 |
| 4.2 | 10.7 | 13.0 |

TABLE 4-continued

| AvO IN WASH SOLUTIONS (PPM)* | | |
|---|---|---|
| Time (minutes) | Bleach Granule + Sodium Lauryl Sulfate | Bleach Granule + Sodium Lauryl Sulfate + Adipic Acid |
| 6.3 | 10.4 | 12.6 |

*Average of two runs, 33.8° C., 6-8 grains per gallon hardness, phosphated detergent.

EXAMPLE IV

The effect of surfactant level on the release of 1,12-diperoxydodecanedioic acid was studied with sodium lauryl sulfate as the surfactant dry mixed with the bleach granule. The 1,12 diperoxydodecanedioic acid (DPDA) of Example I, paragraph 1 contains about 34% weight percent DPDA. Bleach Compositions XII–XV were prepared by dry-mixing the bleach granule with differing levels of sodium lauryl sulfate as specified in Table 5. The compositions were prepared to deliver about 10 ppm AvO to the wash solution with total release. These compositions were placed in pouches as described in Example I, paragraph 2. The preparation of the bleach solution and the bleach release measurements were obtained in the manner described in Example I, paragraph 3.

The effect of sodium lauryl sulfate level on bleach release from the pouch is described by the solution AvO data and the bleach release percentages are respectively shown in Table 5A and 5B. The results for Compositions XIII and XIV show that release was delayed with the addition of sodium lauryl sulfate to the bleach granules at a level of about 57% and 10% of the peroxyacid, compared to Composition XII with no surfactant additive. Comparative XIII released about 60% less peroxyacid in about the first half and one and a half minutes of the wash and about 35% less peroxyacid in about the first three minutes of the wash. Composition XIV showed delayed release with about 45% less peroxyacid released to the wash in about the first half and one and a half minutes of the wash. Since the release data for Composition XV indicates that sodium lauryl sulfate at a level of about 5% of the peroxyacid was ineffective in delaying the peroxyacid release from the pouch, somewhat more than 5% level of the sodium lauryl sulfate is necessary to affect the release of 1,12-diperoxydodecanedioic acid under these conditions.

TABLE 5

| COMPOSITION PER POUCH (GRAMS) | | | | |
|---|---|---|---|---|
| Ingredients | XII | XIII | XIV | XV |
| Bleach granule | 15.8 | 15.8 | 15.8 | 15.8 |
| Sodium lauryl sulfate | — | 3.0 | 0.5 | 0.25 |

TABLE 5A

| AvO IN SOLUTION (PPM)* | | | | |
|---|---|---|---|---|
| Time (minutes) | XII | XIII | XIV | XV |
| 0.6 | 4.3 | 1.8 | 2.4 | 6.2 |
| 1.5 | 8.9 | 4.1 | 5.1 | 8.7 |
| 2.7 | 9.4 | 6.1 | 8.4 | 8.9 |
| 4.5 | 9.2 | 8.9 | 8.9 | 9.2 |

*Average of two runs.

TABLE 5B

| BLEACH (AvO) RELEASE (%) MAXIMUM 10 PPM | | | | |
|---|---|---|---|---|
| Time (minutes) | XII | XIII | XIV | XV |
| 0.6 | 43 | 18 | 24 | 62 |
| 1.5 | 89 | 41 | 51 | 87 |
| 2.7 | 94 | 61 | 84 | 89 |
| 4.5 | 92 | 89 | 89 | 92 |

EXAMPLE V

The effect of acid level on the release of 1,12-diperoxydodecanedioic acid and surfactant was studied with adipic acid dry mixed with the bleach granules and sodium lauryl sulfate. The effect of another acid on release of the peroxyacid from the pouch was studied with citric acid. The 1,12-diperoxydodecanedioic acid bleach granules of Example I, were dry-mixed with sodium lauryl sulfate and the acids described in Table 6. Preparation of bleach compositions, the pouch, the bleach solution and the measurement of bleach release into the wash solution also is described in Example I. The compositions were prepared to delivery about 10 ppm AvO to the wash with complete release.

The wash solution AvO data from Compositions XVI-XVIII in Table 6A show that under these conditions adipic acid at about a 19% level of the peroxyacid was effective at increasing the release of 1,12-diperoxydodecanedioic acid in the presence of sodium lauryl sulfate and adipic acid at about the 10% level was marginally effective at increasing the peroxyacid release. The Composition XVII about 60% more peroxyacid was released into the wash within about one and a half minutes and three minutes compared to Composition XVI with no acid present. With Composition XVIII, the lower level of adipic acid did not show appreciably different levels of peroxyacid in the wash until about 3 minutes into the wash cycles as compared to Composition XVI with no acid. Composition XIX, using citric acid at about 50% of the peroxyacid level, showed accelerated release of 1,12-diperoxydodecanedioic acid in the presence of sodium lauryl sulfate. About 44% more peroxyacid was released into the wash solution within one and a half minutes and three minutes of the wash cycle with the citric acid composition as compared to Composition XVI.

TABLE 6

| COMPOSITION PER POUCH (GRAMS) | | | | |
|---|---|---|---|---|
| Ingredient | XVI | XVII | XVIII | XIX |
| Bleach granule* | 15.8 | 15.8 | 15.8 | 15.8 |
| Sodium lauryl sulfate | 3.0 | 3.0 | 3.0 | 3.0 |
| Adipic acid | — | 1.0 | 0.5 | — |
| Citric acid | — | — | — | 3.0 |

*1,12-diperoxydodecanedioic acid at 34% (5.3 grams).

TABLE 6A

| AvO IN WASH SOLUTION (PPM)* | | | | |
|---|---|---|---|---|
| Time (minutes) | XVI | XVII | XVIII | XIX |
| 0.6 | 1.8 | 1.4 | 1.1 | 1.8 |
| 1.3 | 4.1 | 6.8 | 3.7 | 5.9 |
| 3.0 | 6.1 | 9.7 | 9.1 | 8.5 |

*Average of two runs.

EXAMPLE VI

The effect of other acids on the release of the 1,12-diperoxydodecanedioic acid in the presence of surfactant was studied with either succinic acid or benzoic acid dry mixed with the bleach granule and sodium lauryl sulfate. A second bleach granule of 1,12-diperoxydodecanedioic acid was prepared in the same manner as described in Example I, paragraph 1 and analyzed to have a AvO of 3.8%.

This bleach granule (17 grams) is dry mixed with sodium lauryl sulfate (3 grams) and the acids (3 grams) specified in Table 7, and then placed in pouches to make Compositions XX-XXII. The procedures for the preparation of the pouch, bleach solutions and the measurement of the bleach, release into the wash solution were the same as those described in Example I.

The wash solution AvO data in Table 7A show that the addition of either succinic acid or benzoic acid at about 60% of the peroxyacid level accelerated the release into the wash of 1,12-diperoxydodecanedioic acid in the presence of the surfactant.

TABLE 7

| COMPOSITION PER POUCH (GRAMS) | | | |
|---|---|---|---|
| Ingredients | XX | XXI | XXII |
| Bleach granule* | 17.0 | 17.0 | 17.0 |
| Sodium lauryl sulfate | 3.0 | 3.0 | 3.0 |
| Succinic acid | — | 3.0 | — |
| Benzoic acid | — | — | 3.0 |

*1,12-diperoxydodecanedioic acid at 31%.

TABLE 7A

| AvO IN WASH SOLUTION (PPM) | | | |
|---|---|---|---|
| Time (minutes) | XX | XXI | XXII |
| 0.67 | 0.8 | 1.0 | 1.5 |
| 2.0 | 4.3 | 9.2 | 8.9 |
| 3.7 | 9.2 | 8.2 | 8.7 |

What is claimed is:

1. A dry, granular laundry bleach product in a pouch comprising:

I. a peroxyacid bleach selected from the group consisting of hydrotropic acid hydrophilic peroxyacid bleaches, II. an effective amount of a bleach release-delaying agent;

said bleach and agent being contained within a closed water-insoluble but water-permeable pouch of fibrous material; said agent consisting of a surfactant selected from the group consisting of peroxyacid compatible synthetic detergents and short chain fatty acid soaps having carbon chain lengths of from about 8 to 14, whereby said agent delays the release of said peroxyacid bleach from said pouch into laundry wash liquor.

2. The invention of claim 1 wherein said bleach release-delaying agent is present at a level of at least about 10% by weight of said peroxyacid bleach.

3. The invention of claim 1 wherein said peroxyacid is selected from the group consisting of: diperoxyphthalic, 1,12-diperoxydodecanedioic, 1,11-diperoxyundecanedioic, diperoxyazelaic, diperoxyadipic, and perbenzoic acids.

4. The invention of claim 2 wherein said bleach release-delaying agent is a surfactant selected from the group consisting of: sodium lauryl sulfate, sodium laurate, ethoxylated tallow alcohol and linear alkyl benzene sulfonate.

5. The invention of claim 1 wherein said pouch of fibrous material is: polyester fibers having a density of about 5–100 gm/m$^2$ and wherein said pouch material has a pore size such that there is substantially no leakage of the granular bleach product.

6. The invention of claim 5 wherein said density is about 40–65 gm/m$^2$.

7. The invention of claim 1, 2, 3, 4, 5, or 6 wherein said bleach is 1,12-diperoxydodecanedioic acid and said agent is sodium lauryl sulfate wherein said agent is present at a level of from about 10% to about 60% by weight of said bleach.

8. The invention of claim 1, 2, 3, 4, 5, or 6 wherein said bleach is 1,12-diperoxydodecanedioic acid and said agent is sodium laurate wherein said agent is present at a level of from about 10% to about 60% by weight of said bleach.

* * * * *

UNITED STATES PATENT AND TRADEMARK OFFICE

CERTIFICATE OF CORRECTION

PATENT NO. : 4,391,723

DATED : July 5, 1983

INVENTOR(S) : Dennis R. Bacon & Frank P. Bossu

It is certified that error appears in the above-identified patent and that said Letters Patent are hereby corrected as shown below:

Col. 1, line 31, "are" should be -- and --.

Col. 18, line 35, "$C_3$LAS" should be -- $C_{13}$LAS --.

Col. 20, line 34, "The" should be -- With --.

Col. 21, line 16, after "bleach" and before "release" delete -- , --.

Col. 22, line 2, "acid" should be -- and --.

Signed and Sealed this

*Thirteenth* Day of *December 1983*

[SEAL]

*Attest:*

GERALD J. MOSSINGHOFF

*Attesting Officer* *Commissioner of Patents and Trademarks*